July 9, 1968     T. D. BISHOP     3,391,589
APPARATUS FOR CUTTING BLANKS FROM BOARD AND SEPARATING
THE SCRAP FROM THE BLANKS
Filed March 30, 1966     2 Sheets-Sheet 1
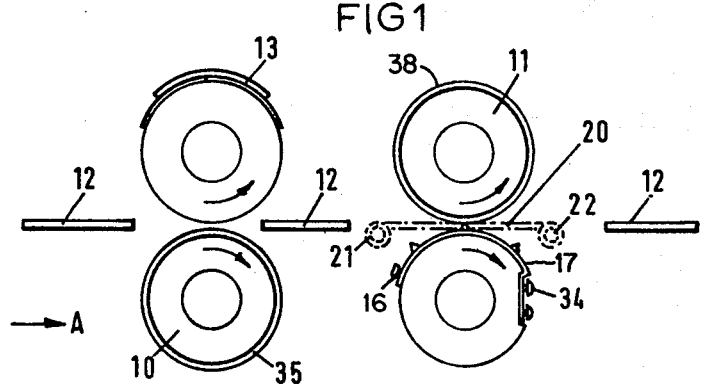
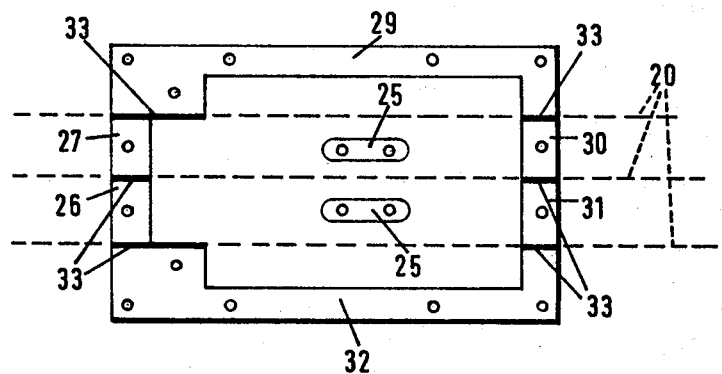
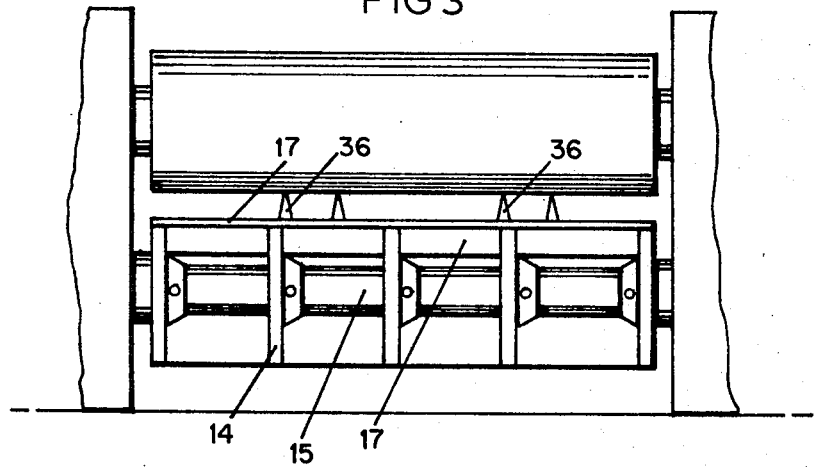

July 9, 1968   T. D. BISHOP   3,391,589
APPARATUS FOR CUTTING BLANKS FROM BOARD AND SEPARATING
THE SCRAP FROM THE BLANKS
Filed March 30, 1966   2 Sheets-Sheet 2 ited States Patent Office 3,391,589
Patented July 9, 1968

3,391,589
APPARATUS FOR CUTTING BLANKS FROM BOARD AND SEPARATING THE SCRAP FROM THE BLANKS
Thomas D. Bishop, Solihull, England, assignor to The Deritend Engineering Company Limited, Birmingham, England, a British company
Filed Mar. 30, 1966, Ser. No. 538,772
Claims priority, application Great Britain, Apr. 9, 1965, 15,071/65
2 Claims. (Cl. 83—103)

ABSTRACT OF THE DISCLOSURE

Apparatus for cutting blanks from board and separating the scrap from the blanks, comprising a pair of rolls one of which carries on its periphery a die for cutting blanks from the board, a second pair of rolls one of which carries on its periphery a plurality of pickers for impaling the scrap to carry it away from the blanks, a support including a plurality of wires which are stretched between and substantially tangent to the rolls of the second pair, which extend between the board and the roll that carries the pickers, parallel to the direction of travel of the board, and which are distributed across the width of the board, and means carried by the first pair of rolls for making cuts across the scrap each of which is parallel to the direction of travel of the board and in alignment with one of such wires.

---

This invention relates to apparatus for cutting cardboard and like materials particularly of the kind in which blanks of the material or alternatively a continuous web of the material is cut into separate pieces consisting of the finished piece or blank and one or more scrap pieces. This occurs for example where the piece being cut is smaller than the blank in both directions so that there is a continuous or substantially continuous strip of material separate around the whole of the periphery of the continuous piece and this also occurs where comparatively small and sometimes narrow pieces are cut out of the material to provide hand holes or to receive parts of internal separators and for other purposes. U.S. Patent No. 2,888,860 describes a support in the form of tensioned wires which can be used to facilitate the separation of the scrap from the finished blank when the scrap consists of comparatively small pieces. However, the support described in that patent cannot be used satisfactorily when a continuous or substantially continuous strip of scrap is left around the whole of the periphery of the finished blank.

The objects of the present invention are to provide improvements relating to the stripping of the cut pieces, and particularly to provide apparatus which supports a blank or finished piece satisfactorily to permit removal of scrap which extends around the whole of the periphery of the finished piece.

Summary of the invention

In accordance with the present invention stripping means for use with apparatus for cutting cardboard and like materials are provided on a roll pair which is distinct and separate from the cutting means, and comprise pickers or other means for separating the pieces from the blanks, said pickers or other means being welded to a sheet metal forme. Hence, the said forme may be made on the same equipment as the die for the actual cutting and creasing operations. A plurality of wires are stretched between and substantially tangent to the rolls of this pair, so as to extend between the cardboard and the roll that carries the pickers, parallel to the direction of travel of the cardboard. The present invention resides in distributing the wires across the width of the cardboard, and in providing, as part of the cutting means, apparatus for making cuts across the scrap each of which is parallel to the direction of travel of the cardboard and in alignment with one of the wires.

The stripping roll pair may be constructed of comparatively light materials, since the rigidity and resistance required are inherently much less than is the case with a die-cutting roll pair. Possibly at least the female roll is of skeleton nature being made up of an assembly of laterial and peripheral members.

One preferred embodiment of the invention is now more particularly described with reference to the accompanying drawings wherein:

Brief description of the drawings

FIGURE 1 is a diagrammatic side elevation of a cardboard "converting" apparatus;
FIGURE 2 is a plan view of a blank;
FIGURE 3 is a front elevation of the stripper machine.

Description of the preferred embodiment

Figure 4:
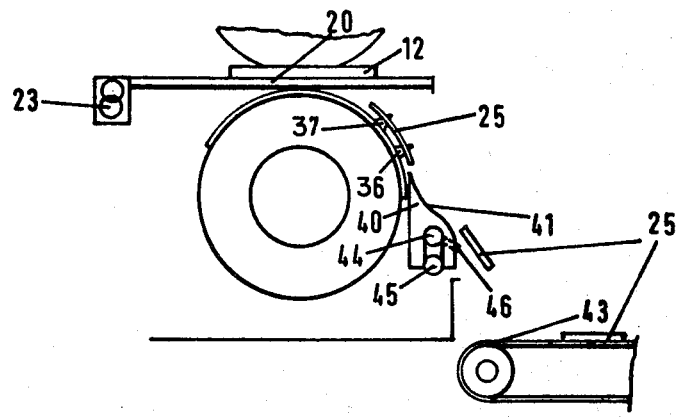
FIGURE 4 is an enlarged side elevation showing a detail.
Figure 5:
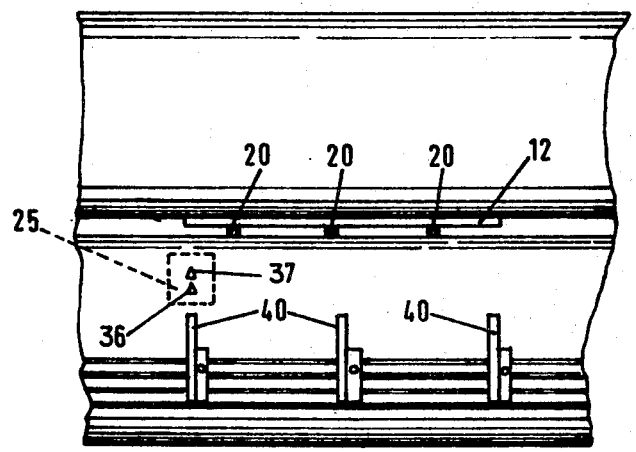
FIGURE 5 is a fragmentary front view.

Referring now to the drawings FIGURE 1 shows two successive roll pairs 10, 11, arranged to treat blanks 12, or a web, fed in the direction of arrow A through the nips of the two roll pairs. The first of the roll pairs 10, constitutes a die-cutting pair and may be provided with a die 13, constructed for example as more particularly described and claimed in my co-pending application Ser. No. 520,691. Briefly, the surface of one of the rolls of pair 10 is provided with a sheet metal forme carrying a pattern of cutting and creasing rules secured to a pattern of individual studs which are welded, for example electrically welded by a capacitor discharge welding gun to the sheet metal.

The second of the roll pairs 11, shown in FIGURE 1 is adapted for stripping, that is to say, removing the fragments of board from the blank or from the web such fragments being the parts not required in the finished blank.

For example where the blank is to be erected into a cardboard box and the box is to have hand-holes the material from the holes is to be removed as aforesaid; further where the finished blank occupies only a portion of the width of the material fed through the die-cutter roll pair and similarly only a portion of the length thereof, the remaining material is scrap and is to be removed.

The invention provides, as a feature, means for impaling the scrap so as to carry it about the periphery of the male roll of the stripping roll pair, whilst the remainder of the blank is fed in a continued straight line movement. For this purpose, the stripping roll pair is associated with a series of strained wires 20, which extend through the nip of the said roll pair, substantially tangent to the rolls, and support the web or blank thereon. Each of the wires is secured at each end to a corresponding shaft 21, 22 extending transversely of the feed direction, and each shaft is fixed in a rectangular bracket mounted on a pivot 23, FIGURE 4 so that the shaft and rectangular bracket constitute a cam mounted upon the pivot 23, whereby the wires can be tensioned. It will be appreciated that the wires are to extend across the blanks along lines where there is no scrap to be removed. For example, by reference to FIGURE 2 which illustrates a blank in position in the stripping roll pair it will be seen that each of the hand-hold pieces 25 lies between a pair of wires 20, 20. However, it is also desirable that the wires be distributed with reasonable uniformity across the width of the board, so as to support the finished blank at all points in order to insure complete separation of the scrap from the blank. In the case of the trim 26–32 around the periphery of the blank it is inevitable that scrap will extend across the wires and distribution of the wires across the width of the board is made possible in accordance with the present invention by providing slots 33 or cuts transversely of the trim in alignment with the wires, so that a separate piece 26, 27, 30, 31 between each pair of wires may be removed; in the case of trim 29, 32 extending parallel to the wires there is of course no difficulty in this connection. FIG. 2 shows all of the cuts which are made in the board by the cutting die 13, and thus shows a planar development of the cutting rules in the die 13 which make the cuts 33 and cut out the hand-hold pieces 25, and also cut out the finished blank which is surrounded by the scrap pieces 26–32.

In order to allow for the manufacture of a wide range of different shapes and sizes of blanks, it is necessary to allow for lateral displacement of the wires, and this is possible upon the said shafts, 21, 22, by release of a clamping means to permit each of the shafts 21, 22 to be rotated about its pivot 23 so as to release the tension in the wires 20, in order to permit the loops formed at the ends of the wires 20 to be slid along the shafts 21, 22 to new positions.

The male roll of the stripping pair may be fabricated not as a solid roll, but of a series of discs 14 threaded upon a common driving shaft 15, and individually secured thereon, as best seen in FIGURE 3.

Each disc is preferably notched (FIG. 1) so that a sheet-metal forme 17 may be secured upon the cylindrical surface of the roll by bolts 16 passing through holes in one edge of the forme 17 and may be tensioned by turnbuckles 34 connected into the said disc notches.

Figure 6:
FIGURE 6 is a perspective view of a part.

The sheet metal forme is provided with a pattern of pickers, one of which is illustrated in FIGURE 6, these being individually spot welded to the forme by the same technique as hereinbefore described with reference to the cutting die, and most conveniently, by using the same die-making apparatus as described in the said co-pending application and possibly with the use of the same patterns etc.

It will be appreciated that each of the pickers has its longitudinal axis lying radially of the roll, and the female roll of the stripping pair is provided with a blanket 38, of polyurethane or other resilient material into which the pickers embed as they pass through the nip so as to ensure complete impalement of the scrap pieces on the said pickers at that point. The female roll of the cutting pair 10 is provided with a similar resilient blanket 35 into which the cutting die 13 embeds as it passes through the nip of the roll pair 10.

It will be appreciated that as the cut blank enters the nip of the roll pair 11, scrap pieces are impaled, and pulled out of the blank which is guided and maintained in the original plane by the wires 20, and the scrap pieces continue about the roll periphery until removed from the pickers by stripping means best shown in FIGURE 4.

FIGURE 4 illustrates diagrammatically the position where a scrap piece 25 impaled on a pair of pickers 36, 37 is being carried below the wires 20, by the roll rotation.

Each of the stripping means comprises a stripper blade or finger 40 which is held so as to extend substantially tangentially of the forme and hence of the male roll and having a thin and possibly pointed end so as to pass between the impaled pieces and the forme in each case, see FIGURE 4. The stripper has a curved profile 41, which causes the scrap pieces to be displaced radially outwards from the roll axis as the picker moves away from the said tangential line. The said curved profile also serves to guide the impaled pieces when removed from the pickers into a discharge chute and on to a conveyor 43 for removing them from the machine.

Each stripper comprises a U-shaped shank and between the limbs of the U are received a pair of guide shafts 44, 45 extending transversely of the machine. A grub screw 46 or the like is provided to clamp each stripper to the guide shafts and it will be appreciated that by releasing the grub screws the strippers may be slid parallel to the roll axis so as to enable one or more strippers to be aligned on one or either side of each picker so as to separate impaled scrap therefrom.

Whilst the pickers must essentially be located on lines different from the wires, there is no such limitation in the case of the strippers since the strippers do not move during normal running of the machine, and are held outside the plane of the blank.

It is to be appreciated that the stripper roll pair 11, or at least the male roll thereof is essentially driven with the cutting roll pair 10, or alternatively is synchronised with the feed of the blanks so that each picker will essentially impale a corresponding piece of scrap and will not impale the blank except at a scrap area thereof.

I claim:
1. Apparatus for cutting blanks from board and separating the scrap from the blanks, comprising a pair of rolls one of which carries on its periphery a die for cutting blanks from the board, and a second pair of rolls one of which carries on its periphery a plurality of pickers for impaling the scrap to carry it away from the blanks, wherein the improvement comprises a support including a plurality of wires which are stretched between and substantially tangent to the rolls of the second pair, which extend between the board and the roll that carries the pickers, parallel to the direction of travel of the board, and which are distributed across the width of the board, and means carried by the first pair of rolls for making cuts across the scrap each of which is parallel to the direction of travel of the board and in alignment with one of such wires.

2. Apparatus as claimed in claim 1, wherein the wires are secured at one end upon a cam which is pivoted upon an axis parallel to the axes of the second pair of rolls, for tensioning the wires.

References Cited

UNITED STATES PATENTS

| 2,647,446 | 8/1953 | Kane | 93—36 |
| 2,888,860 | 6/1959 | Baumgartner | 93—36 |
| 3,270,602 | 8/1966 | Kirby | 93—36 X |

WILLIAM S. LAWSON, *Primary Examiner.*